United States Patent Office 3,160,467
Patented Dec. 8, 1964

3,160,467
NEW AZO DYESTUFFS AND A PROCESS FOR DYEING POLYACRYLIC FIBRES
Robert Frédéric Michel Sureau, Enghien-les-Bains, and Gilbert Krémer, Ermont, France, assignors to Compagnie Française des Matières Colorantes, Paris, France, a French company
No Drawing. Filed May 5, 1961, Ser. No. 107,888
Claims priority, application France May 6, 1960
6 Claims. (Cl. 8—41)

The present invention relates to the application to the colouration of polyacrylic fibres of amino-monoazo dyestuffs of the general formula:

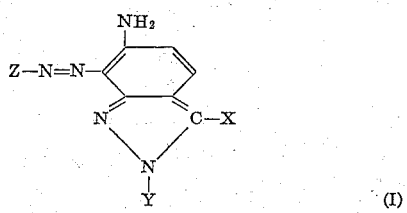

in which X represents a hydrogen or chlorine atom, Y represents a methyl or ethyl group and Z represents a phenyl group which may be substituted by chlorine atoms, methyl groups, methoxy groups, ethoxy groups, nitro groups, trifluoromethyl groups, or dimethylamino groups. It has been found that the dyestuffs of Formula I in the form of salts soluble in water are capable of colouring synthetic fibres based on polymers or copolymers of acrylonitrile.

These dyestuffs are generally very soluble in the form of salts of mineral acids or strong organic acids such as, for example, hydrochloric acid, sulphuric acid, formic acid or chloracetic acids. They dye fibres based on polymers or copolymers of acrylonitrile in shades, passing from orange yellow to violet, which are generally very brilliant and which have good general fastness. The dyeing is carried out at the boil in the presence of a small quantity, e.g., 1% to 2% based on the weight of the fibre, of mineral or strong organic acid.

Dyestuffs of Formula I may be obtained, for example, by means of either of the following processes:

A. Diazotisation of a primary benzenic amine and coupling with a 6-amino-2-alkyl-indazole of the general formula:

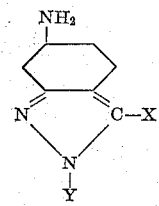

in which X and Y have the meanings given above. The dyestuff obtained is soluble in water in the form of the salt of a mineral or strong organic acid.

B. Diazotisation of a primary benzenic amine, coupling with a 6-amino-indazole of the formula:

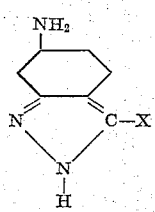

in which X has the meaning given above. Treatment of the dyestuff thus obtained with methyl or ethyl halide or sulphate in an organic solvent medium results in a water soluble salt. It has been found, in fact, that the action of these alkylating agents is shown by fixation of an alkyl group in the 2-position and precipitation of the alkylated dyestuff; the latter is converted into the salt by the anion liberated during the alkylation. On account of the insolubility of the salt of the dyestuff thus obtained in the reaction medium, the reaction stops at this stage. The saline non-quaternary nature of the dyestuff obtained is easily shown thus: on making its aqueous solution alkaline, a dyestuff identical with that obtained by the first method is liberated.

The following examples are given without the invention being limited thereto; the parts are by weight unless the contrary is indicated.

Example 1

24 parts of p-anisidine are dissolved in 200 parts of water and 60 parts by volume of hydrochloric acid at a concentration of 365 g. per litre. Ice is added to keep the temperature between 0° C. and 5° C. and diazotisation is effected by the addition of 14 parts of sodium nitrite dissolved in 25 parts of water. After 20 minutes, any excess of nitrous acid is destroyed by the addition of just sufficient sulphamic acid solution, the reaction product is filtered and the diazo derivative is introduced into a solution of 28 parts of 6-amino-indazole in 400 parts of water and 22 parts by volume of hydrochloric acid at a concentration of 365 g. per litre. About 200 parts by volume of a 25% solution of sodium acetate are slowly added until a neutral reaction is given with Congo red paper. After stirring for two hours, the coupling is finished by the slow introduction of dilute ammonia so as to bring the pH to 6 to 6.5. After mixing for an hour, the medium is made distinctly alkaline by a fresh addition of ammonia. The free base of the dyestuff is liberated as a yellow precipitate which is filtered off, washed, drained and dried. 5.3 parts of this dyestuff are dissolved in 150 parts of boiling chlorobenzene, and a mixture of 5 parts of dimethyl sulphate and 20 parts of chlorobenzene is introduced into this solution. The mixture is then refluxed for an hour. A dark brown precipitate is formed which, after cooling, is filtered off and washed with a little petroleum ether. This dyestuff dyes polyacrylic fibres in a boiling neutral bath or a bath slightly acid with sulphuric acid, e.g., containing 1% to 2% of acid based on the weight of the fibres, and gives a full-bodied red shade which is a little more bluish than that of the dyestuff not treated with dimethyl sulphate.

Example 2

14 parts of the dyestuff obtained in a similar way to that of Example 1, by coupling the diazo derivative of p-phenetidine with 6-amino-indazole, are dissolved in 300 parts of boiling chlorobenzene. The filtered solution is treated with a mixture of 15 parts of diethyl sulphate and 60 parts of chlorobenzene over a period of 15 minutes under gentle reflux, and gentle boiling is continued for 2 hours. The product is allowed to cool, the solvent is separated and the tarry sediment is taken up with two lots of 300 parts of boiling water. The solution obtained is filtered in order to separate an insoluble residue and 250 parts by volume of a saturated solution of sodium chloride are added to the filtrate at 50 to 60° C. The mixture is allowed to cool with stirring and the dark red brown precipitate obtained is filtered off. The dyestuff dyes polyacrylic fibres a Bordeaux shade having excellent general fastness.

Example 3

24 parts of p-anisidine are dissolved in 200 parts of water and 60 parts by volume of hydrochloric acid at a concentration of 365 g. per litre. Ice is added to keep the temperature between 0° C. and 5° C. and diazotisation is effected by the addition of 14 parts of sodium nitrite dissolved in 25 parts of water. After 20 minutes any excess nitrous acid present is destroyed by the addition of just sufficient sulphamic acid solution, the product is filtered and the diazo derivative thus obtained is introduced into a solution of 30 parts of 6-amino-2-methyl-indazole in 400 parts of water and 22 parts by volume of hydrochloric acid at a concentration of 365 g. per litre. About 200 parts by volume of a 25% solution of sodium acetate are slowly added until a neutral reaction on Congo red paper is obtained. After stirring for two hours, the coupling is finished by the slow introduction of a dilute solution of ammonia so as to bring the pH to 6 to 6.5. After stirring for an hour, the precipitated aminoazo compound is filtered off, washed and dried at 100° C. 60 parts of dyestuff are thus obtained in the form of the dark red brown hydrochloride.

This dyestuff dyes fibres based on polymers or copolymers of acrylonitrile from a bath containing 1% of sulphuric or monochloracetic acid, calculated on the weight of the material, a full-bodied bright red shade having very good general fastness.

If an aqueous solution of this dyestuff is made distinctly alkaline by the addition of caustic soda, the dyestuff is precipitated as the free base, the melting point of which is 185 to 186° C. after recrystallisation from chlorobenzene.

If, on the other hand, the same process of rendering alkaline is carried out on a solution of the dyestuff obtained according to Example 1 by the action of methyl sulphate on the aminoazo compound resulting from coupling the diazo derivative of p-anisidine with 6-amino-indazole, a dyestuff identical with the above is obtained, of melting point 185 to 186° C., which is not lowered on mixing the two.

In the following table a number of other analogous examples are grouped together.

| No. | Diazotised amine | Amino coupled | Shade on polyacrylic fibres of the dyestuff treated with dimethyl sulphate |
|---|---|---|---|
| 4 | o-Chloraniline | 6-amino-indazole | Red orange. |
| 5 | m-Chloraniline | do | Orange. |
| 6 | o-Anisidine | do | Bluish red. |
| 7 | o-Toluidine | do | Scarlet. |
| 8 | m-Toluidine | do | Orange. |
| 9 | p-Toluidine | do | Red orange. |
| 10 | o-Nitraniline | do | Orange. |
| 11 | m-Nitraniline | do | Do. |
| 12 | m-Trifluoromethyl-aniline | do | Do. |
| 13 | p-Dimethylamino-aniline | do | Green grey. |
| 14 | o-Phenetidine | do | Red. |
| 15 | p-Phenetidine | do | Bluish red. |
| 16 | 2,4-dimethylaniline | do | Scarlet. |
| 17 | 4-Chloro-2-amino-toluene | do | Reddish orange. |
| 18 | 4-Nitro-2-amino-anisole | do | Orange. |
| 19 | 3-Nitro-4-amino-anisole | do | Bordeaux. |
| 20 | 4-Chloro-2-amino-anisole | do | Red. |
| 21 | 2,5-dimethoxyaniline | do | Violet. |
| 22 | 4-Methyl-2-amino-anisole | do | Bordeaux. |
| 23 | Aniline | 6-amino-3-chloro-indazole | Orange. |
| 24 | o-Toluidine | do | Do. |
| 25 | p-Toluidine | do | Do. |
| 26 | o-Anisidine | do | Red. |
| 27 | p-Anisidine | do | Bluish red. |
| 28 | p-Nitraniline | do | Orange. |

On coupling 6-amino-2-methyl-indazole with the diazo derivatives of orthochloraniline, orthoanisidine, p-toluidine or 2,5-dimethoxyaniline, dyestuffs respectively identical with the dyestuffs Nos. 4, 6, 9 and 21 of the table are obtained.

We claim:
1. A process for colouring polyacrylic fibres which comprises dyeing the fibres with a water-soluble salt of a dyestuff selected from the group consisting of the dyestuffs of the general formula:

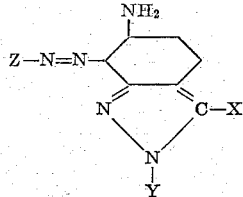

in which X represents a member selected from the group consisting of the hydrogen and chlorine atoms, Y represents a member selected from the group consisting of the methyl and ethyl groups, and Z represents a member selected from the groups consisting of the unsubstituted phenyl group and phenyl groups substituted by members selected from the group consisting of the chlorine atom, the methyl group, the methoxy group, the ethoxy group, the nitro group, the trifluoromethyl group, the dimethylamino group, the dyeing taking place at the boil in the presence of a member selected from the group consisting of mineral and strong organic acids.

2. A process for colouring polyacrylic fibres which comprises dyeing the fibres with a water-soluble salt of the dyestuff of the following formula:

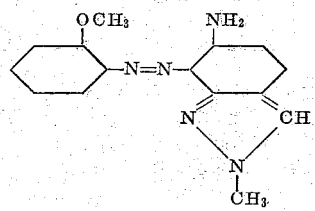

the dyeing taking place at the boil in the presence of a member selected from the group consisting of mineral and strong organic acids.

3. A process for colouring polyacrylic fibres which comprises dyeing the fibres with a water-soluble salt of the dyestuff of the following formula:

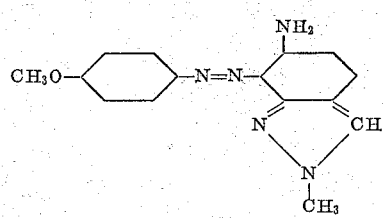

the dyeing taking place at the boil in the presence of a member selected from the group consisting of mineral and strong organic acids.

4. A process for colouring polyacrylic fibres which comprises dyeing the fibres with a water-soluble salt of the dyestuff of the following formula:

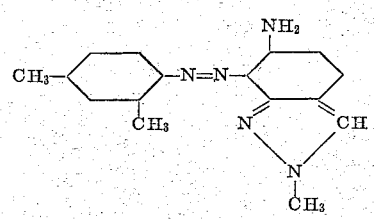

the dyeing taking place at the boil in the presence of a member selected from the group consisting of mineral and strong organic acids.

5. A process for colouring polyacrylic fibres which comprises dyeing the fibres with a water-soluble salt of the dyestuff of the following formula:

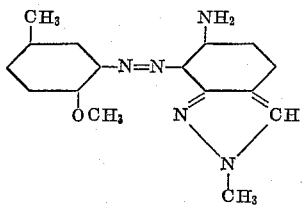

the dyeing taking place at the boil in the presence of a member selected from the group consisting of mineral and strong organic acids.

6. A process for colouring polyacrylic fibres which comprises dyeing the fibres with a water-soluble salt of the dyestuff of the following formula:

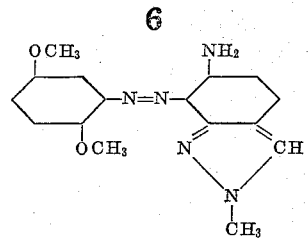

the dyeing taking place at the boil in the presence of a member selected from the group consisting of mineral and strong organic acids.

References Cited in the file of this patent
UNITED STATES PATENTS

| | | |
|---|---|---|
| 2,282,323 | Dickey et al. | May 12, 1942 |
| 2,308,023 | Peterson et al. | Jan. 12, 1943 |
| 2,819,943 | Rhyner et al. | Jan. 14, 1958 |
| 2,825,726 | Towne et al. | Mar. 4, 1958 |
| 2,828,301 | Sureau et al. | Mar. 25, 1958 |
| 2,857,371 | Straley et al. | Oct. 21, 1958 |
| 2,868,775 | Straley et al. | Jan. 13, 1959 |
| 2,883,373 | Bossard et al. | Apr. 21, 1959 |
| 2,889,315 | Bossard et al. | June 2, 1959 |